(12) United States Patent
Hopkins et al.

(10) Patent No.: US 12,725,001 B2
(45) **Date of Patent: *Sep. 1, 2026**

(54) MOUNTS FOR TRACKING DEVICES

(71) Applicant: Elevation Lab, Inc., Portland, OR (US)

(72) Inventors: Casey Hopkins, Portland, OR (US); Jacob Hull, Portland, OR (US)

(73) Assignee: Elevation Lab, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/357,978

(22) Filed: Oct. 14, 2025

(65) Prior Publication Data

US 2026/0037769 A1 Feb. 5, 2026

Related U.S. Application Data

(63) Continuation of application No. 18/982,923, filed on Dec. 16, 2024, now Pat. No. 12,475,350, which is a continuation of application No. 18/443,809, filed on Feb. 16, 2024, now Pat. No. 12,204,974, which is a continuation of application No. 18/453,117, filed on Aug. 21, 2023, now Pat. No. 11,934,902.

(51) Int. Cl.
*G06K 19/077* (2006.01)

(52) U.S. Cl.
CPC .............................. *G06K 19/07758* (2013.01)

(58) Field of Classification Search
CPC ................................................ G06K 19/07758
USPC ...................................................... 248/205.3
See application file for complete search history.

(56) References Cited

U.S. PATENT DOCUMENTS

| | | | | |
|---|---|---|---|---|
| 7,598,869 | B2 * | 10/2009 | Kumagai | G07G 1/009 340/572.1 |
| D680,015 | S * | 4/2013 | Hauser | D10/106.9 |
| 2009/0322480 | A1 * | 12/2009 | Benedict | G06K 19/07749 340/10.1 |
| 2022/0051182 | A1 * | 2/2022 | Fox | G06Q 10/0833 |
| 2022/0391656 | A1 * | 12/2022 | Chen | A45C 11/00 |
| 2023/0046992 | A1 * | 2/2023 | Leyva | H04M 1/72445 |
| 2023/0109754 | A1 * | 4/2023 | Newton | G06K 7/10475 235/451 |
| 2024/0211717 | A1 * | 6/2024 | Barovic | G06K 19/0702 |
| 2024/0239144 | A1 * | 7/2024 | Trimnell | G08B 21/0288 |
| 2024/0254809 | A1 * | 8/2024 | Wright | F16M 13/04 |
| 2024/0384872 | A1 * | 11/2024 | Fraser | F23Q 2/38 |

* cited by examiner

*Primary Examiner* — Allyson N Trail
(74) *Attorney, Agent, or Firm* — Kolitch Romano Dascenzo Gates LLP

(57) ABSTRACT

Mounts (10) for securing a tracking device (12) to an article (14) comprise a housing (16) having an internal volume (18) configured to selectively receive and retain the tracking device (12) in the housing (16).

21 Claims, 5 Drawing Sheets

MOUNTS FOR TRACKING DEVICES

RELATED APPLICATIONS

The present application is a continuation of and claims priority to U.S. patent application Ser. No. 18/982,923, which was filed on Dec. 16, 2024, and which is a continuation of claims priority to U.S. patent application Ser. No. 18/443,809, which was filed on Feb. 16, 2024 and issued Jan. 21, 2025 as U.S. Pat. No. 12,204,974, and which is a continuation of and claims priority to U.S. patent application Ser. No. 18/453,117, which was filed on Aug. 21, 2023 and issued Mar. 19, 2024 as U.S. Pat. No. 11,934,902, the complete disclosures of which are hereby incorporated by reference.

FIELD

The present disclosure relates to mounts for tracking devices.

BACKGROUND

In recent years, wireless tracking devices have become popular amongst consumers. Typically, wireless tracking devices are small and require additional hardware to be physically mounted or coupled to an object that a user desires to track. Consumers often use wireless tracking devices for keys, sports equipment, pets, electronic equipment, etc. In some applications, keeping dirt, debris, and water away from the wireless tracking device is important, as is providing a housing for a tracking device that is rugged and holds up to impacts.

SUMMARY

Mounts comprise a housing that has an internal volume that is configured to selectively receive and retain a tracking device in the housing.

DESCRIPTION

Figure 1:
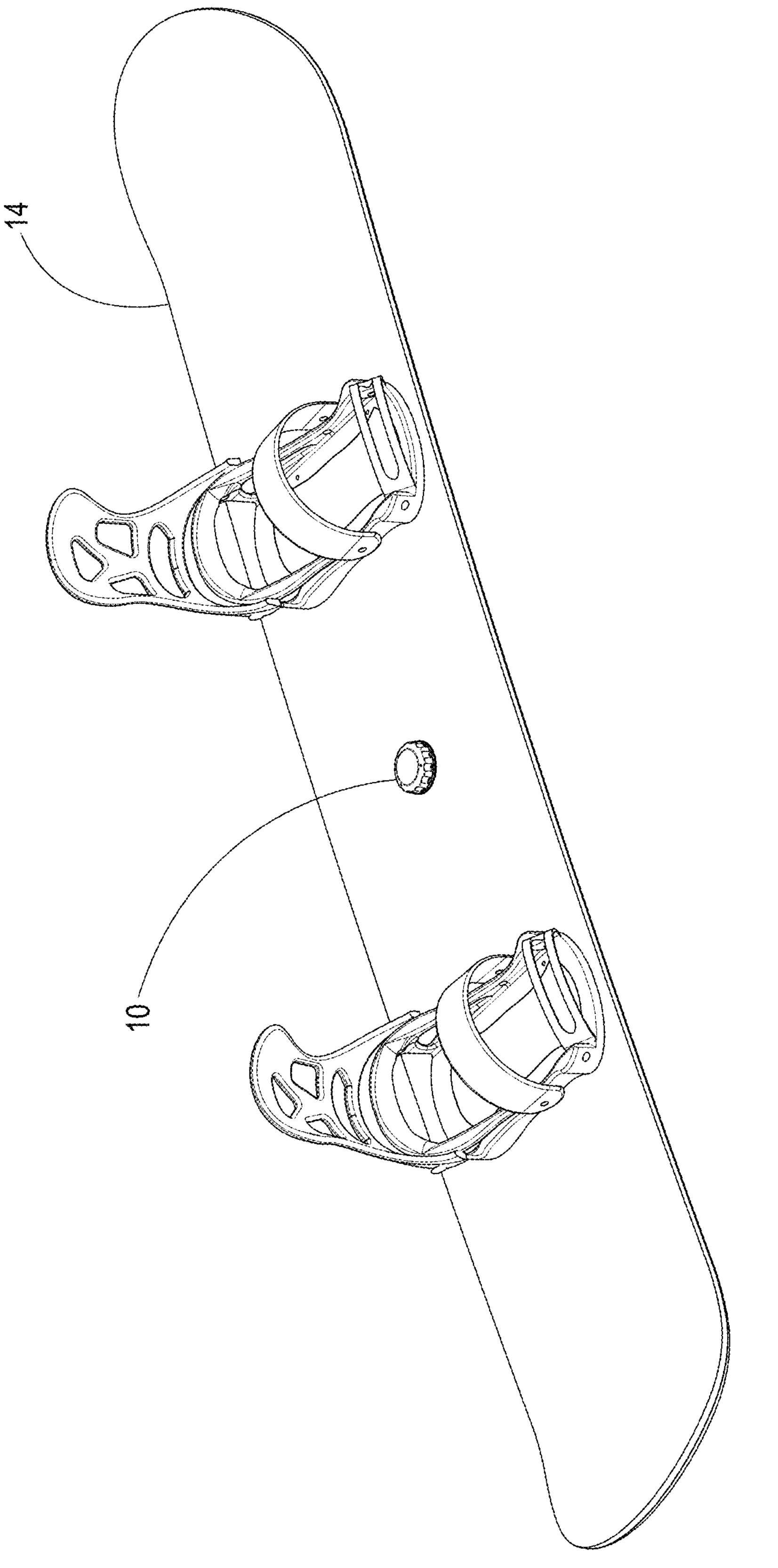
FIG. 1 illustrates an example use case for mounts according to the present disclosure.

Mounts 10 for securing devices 12 to articles 14 are disclosed herein. Examples of devices 12 include wireless (e.g., Wifi, Bluetooth™, GPS) tracking devices (e.g., Apple AirTag™, Tile™, Samsung Galaxy SmartTag™, Chipolo One™, CubePro™, Orbit™, and Baseus™ branded tracking devices); and examples of articles 14 include sports equipment, snowboards, skis, skateboards, surfboards, paddle boards, stand-up paddle boards, wake boards, water skis, bicycles, hard-sided articles, land vehicles, trailers, All-Terrain-Vehicles (ATVs), motorcycles, watercraft, power tools, cases, luggage, camera gear, coolers, camping equipment, etc. Functionally, mounts 10 may be used to secure a tracking device to an article 14 that a user desires to keep track of. For example, in FIG. 1, an example mount 10 is illustrated attached to a snowboard.

Figure 2:
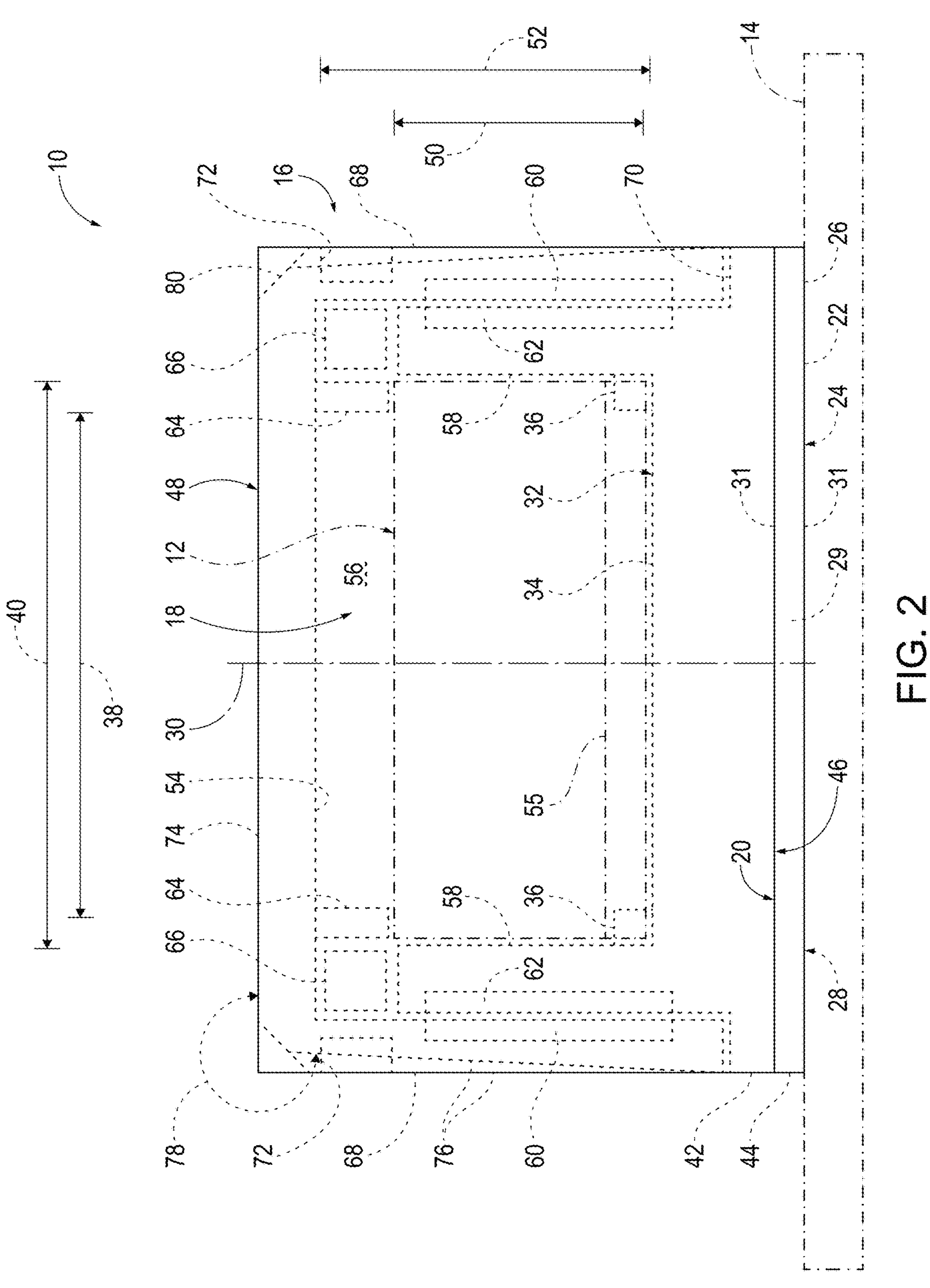
FIG. 2 is a schematic illustration representing mounts for tracking devices according to the present disclosure.

FIG. 2 schematically illustrates mounts 10 according to the present disclosure. Generally, in FIG. 2, elements that are likely to be included in a given example are illustrated in solid lines, while elements that are optional to a given example or correspond to a specific example are illustrated in broken lines. However, elements that are illustrated in solid lines are not essential to all examples of the present disclosure, and an element shown in solid lines may be omitted from a particular example without departing from the scope of the present disclosure. Herein, positional terms such as "upper," "lower," and the like may be used to describe spatial relationships of elements of mounts 10. When used, such terms refer to when a mount 10 is positioned to be operatively attached to the top of a horizontal surface, but does not limit mounts 10 to being secured to an article 14 in a specific orientation, such as on a horizontal surface thereof.

As schematically illustrated in FIG. 2, mounts 10 generally comprise at least a housing 16 and a coupler 20 that is attached to the housing 16. The housing 16 has an internal volume 18 that is configured to selectively receive and retain a device 12, such as a tracking device, in the housing 16. The coupler 20 is configured to be operatively attached to an article 14.

In some examples, the coupler 20 is configured to be operatively attached to a planar surface of an article 14, such as a planar surface of sports equipment. However, this is not required in all examples, and the coupler 20 may be configured to be operatively attached to a non-planar surface, such as a curved, convex, concave, or irregular surface, including being configured to mate with a very specific surface of a particular article 14.

With continued reference to FIG. 2, in some examples, the coupler 20 may be described as comprising an attachment surface 22 opposite the housing 16, and the attachment surface 22 may be described as defining an attachment plane 24. In some such examples, the attachment surface 22 is planar, although this is not required, and the attachment surface 22 may be textured or otherwise non-planar, yet still define an attachment plane 24 for operative attachment to a planar, textured, or non-planar surface of an article 14.

The coupler 20 may take various forms, such that it is configured to operatively attach to surface of an article 14. In some examples, the coupler 20 comprises an adhesive film 26, such as double-sided tape. In some examples, the coupler 20 comprises a double-sided foam tape 28, such as having a foam core 29 sandwiched between two layers of double-sided tape or adhesive 31. When present, the foam core 29 provides a flexible attachment of the mount 10 to an article 14, such that the foam core 29 will absorb impacts to the mount 10 and restrict inadvertent removal of the mount 10 from the article 14. In addition, the foam core 29 enables the mount 10 to be attached to non-smooth, rough, non-flat, and/or curved surfaces of an article 14, for example, with the foam core 29 enabling the lower double-sided tape or adhesive 31 to contour to the surface of the article 14. In some examples, the foam core 29 has a thickness in the range of 0.5-2 millimeters (mm); however, thicknesses outside of this range also may be used. A suitable example of a double-sided foam tape 28 that provides a strong attachment and restricts each removal of a mount 10 from an article 14 is 3M™ VHB™ double-sided tape. Another suitable example of a coupler 20 is a magnet for operative attachment of the mount 10 to an article 14 having a magnetic (e.g., ferrous) surface, such as a vehicle. Mechanical fasteners (e.g., screws, bolts, and the like) also may be used as couplers 20, depending on the use case of a particular mount 10. The coupler 20 also may be or comprise an adhesive (e.g., glue) applied to the housing 16 for operative attachment to an article 14.

As schematically represented in FIG. 2, mounts 10 may be described as defining a central axis 30. In some examples, the mount 10 is substantially radially symmetrical about the central axis 30. For example, some mounts 10 may be described as having a generally circular profile. By "substantially radially symmetrical," it is meant that the mount 10 is at least 75% radially symmetrical, such as being at least 75% round.

With continued reference to FIG. 2, in some examples, the housing 16 may be described as defining a seat 32 within the internal volume 18 that is configured to mate with the device 12. In other words, the seat 32 may be specifically shaped and sized to correspond to one or more surfaces of a specific device 12, such as a specific tracking device. As a result, when a device 12 is operatively received within the internal volume 18, the device 12 will not undesirably rattle or move-around within the internal volume 18 when the mount 10 is moved. In some examples, the seat 32 comprises a lower seat surface 34 that is configured to mate with the device 12. As an example, the lower seat surface 34 may be concave, such as to mate with a convex surface of a particular device, such as an Apple™ AirTag™ device.

As schematically represented in FIG. 2, in some examples, the seat 32 comprises one or more seat ledges 36 that extend around the central axis 30 of the mount 10, such as to engage a particular structure of a particular device 12. As an example, Apple™ AirTag™ devices have a lower convex surface surrounded by a circumferential planar surface. Accordingly, a seat 32 with a concave lower seat surface 34 and one or more seat ledges 36 extending around the central axis 30 of the mount 10 will mate with an Apple™ AirTag™ device.

In some examples, as schematically represented in FIG. 2, the internal volume 18 may be described as having a maximum internal-volume outer dimension 40, and the one or more seat ledges 36 may be described as defining an inside ledge diameter 38 that is less than the maximum internal-volume outer dimension 40. Accordingly, in such examples, when operatively received within the internal volume 18, a particular device 12 will extend over and engage the one or more seat ledges 36. In some examples, a plurality of radially spaced-apart seat ledges 36 are provided resulting in a reduced material cost and lighter weight housing 16 compared to examples where only one seat ledge 36 extends fully around the central axis 30. In such examples where a plurality of seat ledges 36 are provided, the lower seat surface 34 likewise may be defined by a plurality of radially spaced surfaces that collectively define the lower seat surface 34.

With continued reference to FIG. 2, in some examples, the housing 16 may be described as having a housing outermost perimeter 42, and the coupler 20 may be described as having a coupler outermost perimeter 44. In some such examples, the housing outermost perimeter 42 and the coupler outermost perimeter 44 are coextensive with each other. By "coextensive with each other," it is meant that the housing outermost perimeter 42 and the coupler outermost perimeter 44 are within less than 1 mm of each other. When such examples of mounts 10 are operatively attached to an article 14, no gap will be present between the housing 16 and the article 14 that otherwise could be used to pry the housing 16 away from the article 14 and thus, detach the mount 10 from the article 14. That is, such mounts 10 may be described as being securely attached to an article 14 and thus, more secure than mounts that easily may be pried away from an article.

As schematically represented in FIG. 2, in some examples, the housing 16 may be described as comprising a ceiling surface 54 that defines an upper side of the internal volume 18. In some such examples, the internal volume 18 is configured (e.g., shaped and sized) so that when the device 12 is operatively received in the internal volume 18, there is a gap 56 between the device 12 and the ceiling surface 54 and the device 12 is fixed relative to the housing 16. That is, the internal volume 18 may be configured to securely receive the device 12, such that the device 12 does not move or rattle within the internal volume 18, yet a gap 56 is present between the device 12 and the ceiling surface 54. Stated differently, in some examples, the device 12 has a maximum device height 50, and the internal volume 18 has a maximum internal-volume height 52 that is greater than the maximum device height 50. Such a configuration may be advantageous for devices 12 that include a speaker or other sound transmitting mechanism on, near, or directed toward an upper surface of the device 12. For example, Apple™ AirTag™ devices have an internal speaker near the upper surface of the device. Accordingly, when operatively received within the internal volume 18 of such a configured mount 10, the gap 56 facilitates transmission of the speaker's output, which otherwise would be diminished, or even muted, if the housing 16 firmly engaged the upper surface of the device.

With continued reference to FIG. 2, in some examples of mounts 10, the housing 16 comprises a base 46 and a cover 48. The coupler 20 is attached to the base 46, and the cover 48 is removably coupled to the base 46 to permit placement and removal of a device 12 in and from the internal volume 18 of the housing 16. Various mechanisms for securing the cover 48 to the base 46 may be utilized depending on the application, or use case, for a particular mount 10, including (but not limited to) snap-fit arrangements, friction-fit arrangements, threaded arrangements, mechanical fastener arrangements, etc. In some examples, the cover 48 is threadingly coupled to the base 46, and in some such examples, the cover 48 and the base 46 are configured to require at least a 90-degree rotation of the cover 48 relative to the base 46 for attachment and removal of the cover 48 to and from the base 46. Such a configuration serves to restrict liquid, dust, or debris from disadvantageously entering the internal volume 18 when the cover 48 is operatively secured to the base 46.

In some examples, as schematically illustrated in FIG. 2, the base 46 comprises a base sidewall 58 that extends upward from the lower seat surface 34 circumferentially around the central axis 30. In some such examples, in which the cover 48 is threadingly coupled to the base 46, the base sidewall 58 comprises an external thread 60, and the cover 48 comprises an internal thread 62 that is configured to mate with the external thread 60 of the base sidewall 58. In particular, the cover 48 may be described as comprising a skirt 68 that extends circumferentially around the central axis 30 and that comprises the internal thread 62, such that the skirt 68 and the base sidewall 58 collectively define the threaded arrangement between the cover 48 and the base 46.

With continued reference to FIG. 2, in some examples, the cover 48 comprises a rib 64 that extends downward from the ceiling surface 54 and circumferentially around the central axis 30 of the mount 10. In some such examples, the rib 64 is positioned closer to the central axis 30 than the base sidewall 58 when the cover 48 is operatively couped to the base 46. Accordingly, in such examples, when the device 12 is operatively received within the internal volume 18 and the cover 48 is operatively coupled to the base 46, the rib 64 will engage the device 12 and compress the device 12 between the rib 64 and the seat 32. For example, some devices 12 may comprise a spring-loaded battery compartment 55, such that the device 12 is configured to compress in height. An Apple™ AirTag™ device is an example of such a device. Accordingly, when such a device 12 is operatively received within the internal volume 18, and when the cover 48 is operatively coupled to the base 46, the rib 64 will engage an upper surface of the device 12 and compress the device 12 between the rib 64 and the seat 32, resulting in a snug fit of the device 12 within the internal volume 18, such that the device is prevented from rattling or otherwise moving at all within the internal volume 18. As a result, impacts or other movements of the mount 10 will not result in damage to the device 12 that otherwise could occur if the device 12 were not snugly received within the internal volume 18.

As schematically illustrated in FIG. 2, in some examples, the housing 16 further comprises a gasket 66 that is positioned adjacent to the rib 64 and that is positioned to be compressed between the base sidewall 58 and the cover 48 when the cover 48 is operatively coupled to the base 46. The gasket 66 therefor provides a liquid seal between the cover 48 and the base 46 to prevent liquid, as well as debris and dust, from entering the internal volume 18 and potentially damaging a device 12 held therein. In some examples, the gasket 66 is positioned between the rib 64 and the skirt 68. In some examples, the gasket 66 is molded onto the cover 48. In other examples, the gasket 66 is an O-ring or a D-ring.

With continued reference to FIG. 2, in some examples of mounts 10, the base 46 comprises a circumferential flange 70 that extends away from the central axis 30 of the mount 10, and the cover 48 engages the circumferential flange 70 when the cover 48 is operatively coupled to the base 46. Accordingly, this interface between the circumferential flange 70 and the cover 48 provides a first barrier between environment outside of the mount 10 and the internal volume 18. Although not required, an additional or alternative gasket may be provided at this interface for an even greater barrier or seal. In some examples, the circumferential flange 70 defines the housing outermost perimeter 42, discussed above, which in some examples is coextensive with the coupler outermost perimeter 44.

In some examples, as schematically represented in FIG. 2, the cover 48 defines a plurality of depressions 72 that are spaced around the central axis 30 of the mount 10 and that extend into the cover 48 toward the central axis 30. When present, such depressions 72 provide a gripping structure for operative attachment and removal of the cover 48 to and from the base 46. In some such examples, the surfaces of each depression may be at an angle between 180 and 225 degrees relative to one or more circumferentially adjacent surfaces of the cover 48, such that no sharp edges are present that could catch on an object and result in the cover 48 inadvertently being unscrewed from the base 46.

With reference to FIG. 2, the housing 16 (e.g., the cover 48, when present) may be described as comprising a top surface 74 and an outer side surface 76. In some examples of mounts 10, the housing 16 has a chamfer 80 between the top surface 74 and the outer side surface 76. As a result, there is no sharp angle (e.g., about 90 degrees) between two adjacent surfaces, so that if an object were to impact the housing 16, the object will more easily be deflected without damaging the mount 10 or inadvertently detaching the mount 10 from an article 14. That is, the chamfer 80 may be described as a ramped surface for the deflection of objects.

As schematically represented in FIG. 2, in some examples, whether or not a chamfer 80 is present, the outer side surface 76 may be an angle 78 of between 225 and 270 degrees to the top surface 74.

Figure 3:
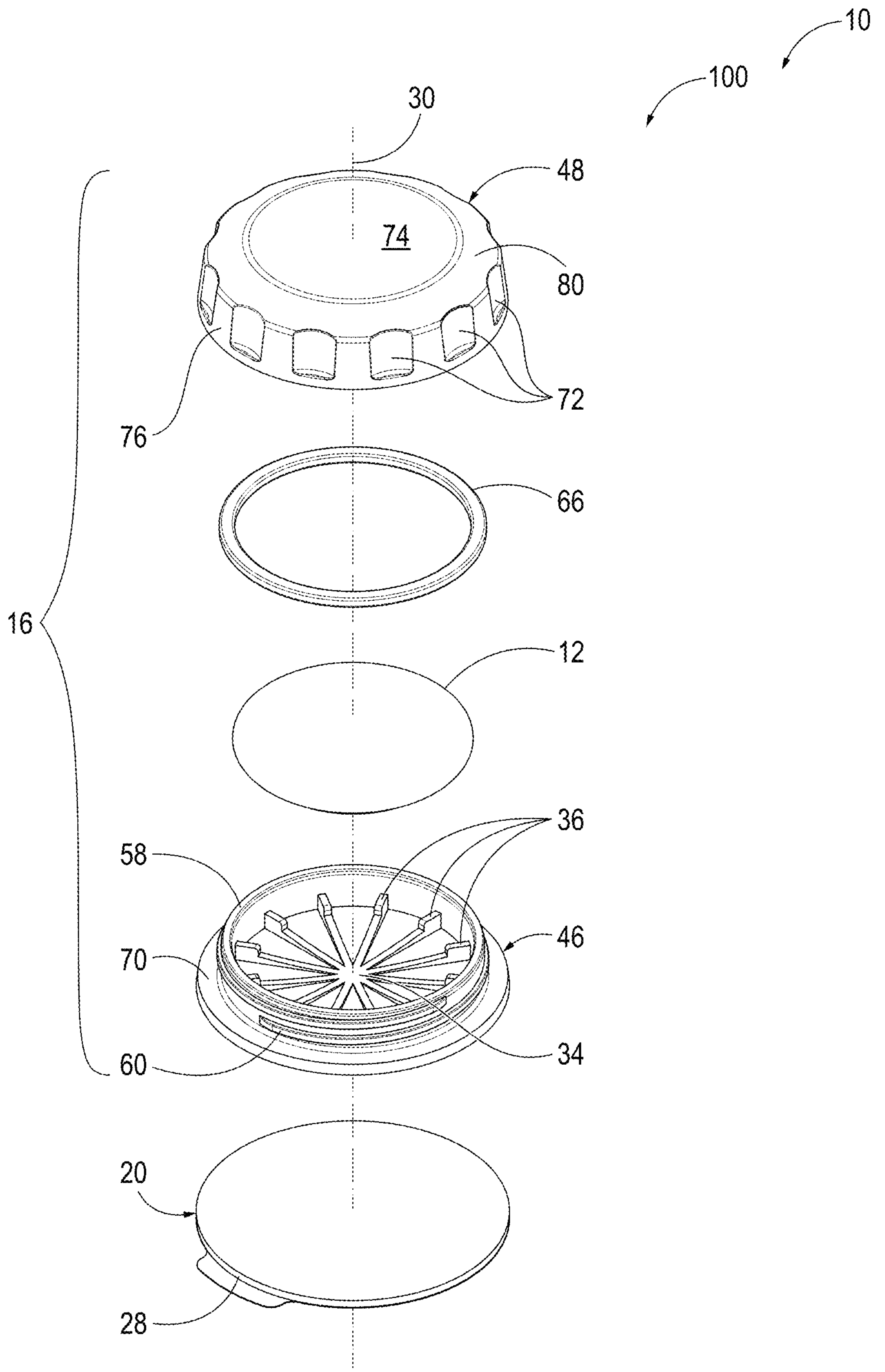
FIG. 3 is an exploded isometric view of an example mount according to the present disclosure, shown with an Apple™ AirTag™ device for placement within the mount.
Figure 4:
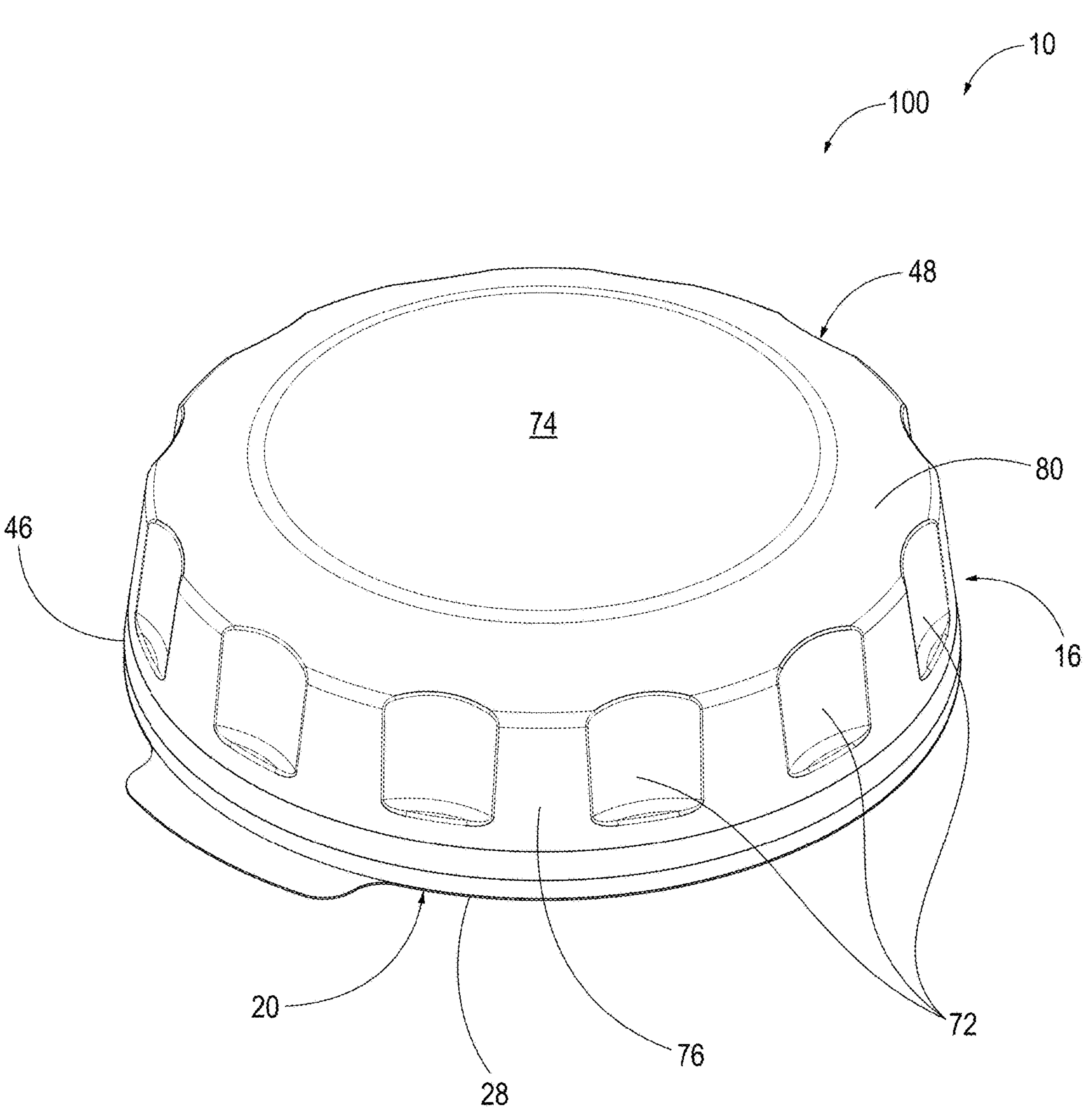
FIG. 4 is an isometric view of the mount of FIG. 3.
Figure 5:
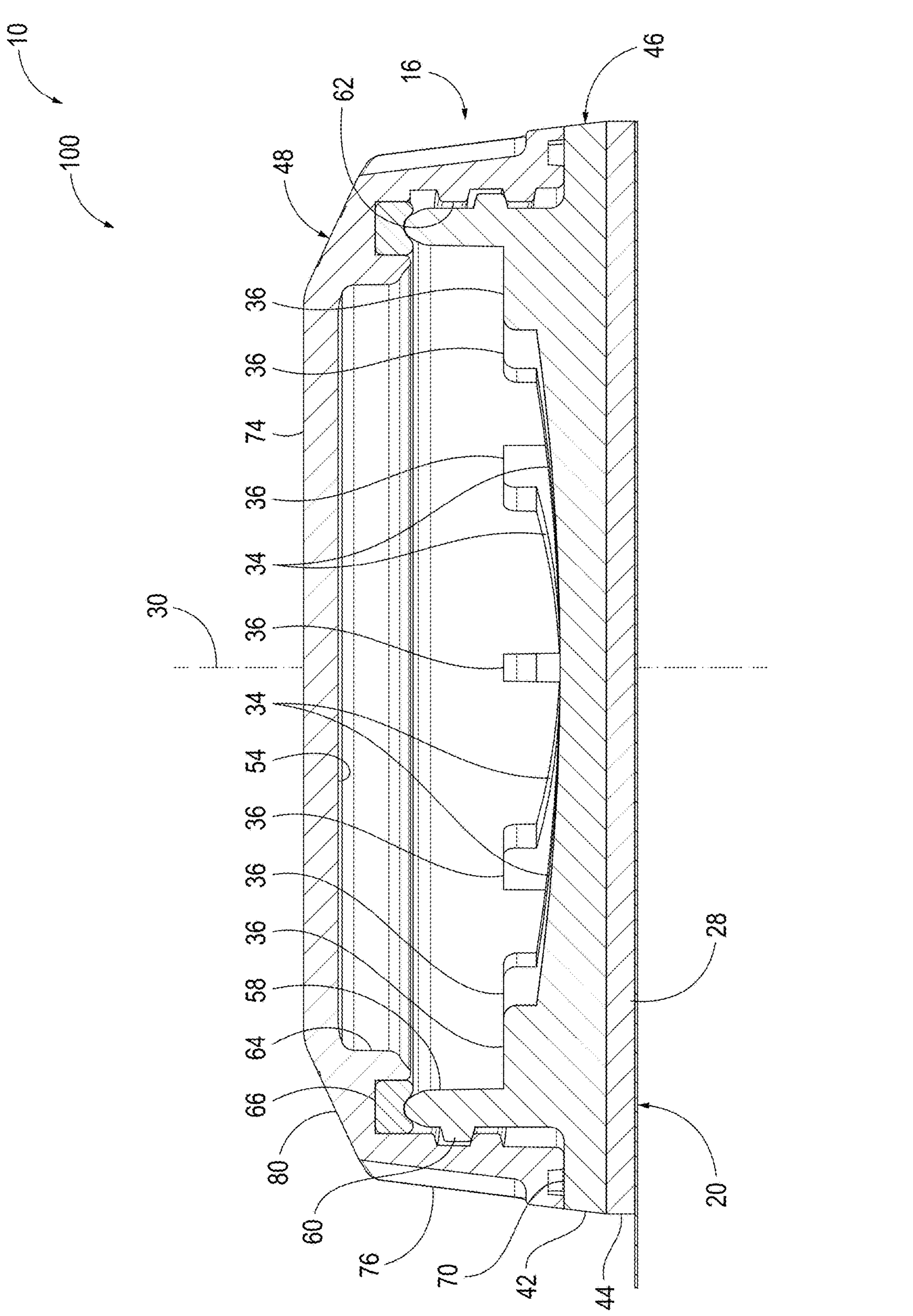
FIG. 5 is a cross-sectional view of the mount of FIG. 3.

Turning now to FIGS. 3-5, an illustrative non-exclusive example of a mount 10 in the form of mount 100 is illustrated. Where appropriate, the reference numerals from the schematic illustration of FIG. 2 are used to designate corresponding parts of mount 100; however, the example of FIGS. 3-5 are non-exclusive and do not limit mounts 10 to the illustrated embodiment of mount 100. That is, mounts 10 are not limited to the specific embodiment of the illustrated mount 100, and mounts 10 may incorporate any number of the various aspects, configurations, characteristics, properties, etc. of mounts 10 that are illustrated in and discussed with reference to the schematic representations of FIG. 2 and/or the embodiment of FIGS. 3-5, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to mount 100; however, it is within the scope of the present disclosure that the previously discussed features, variants, etc. may be utilized with mount 100. Mount 100 is specifically configured to receive an Apple™ AirTag™ device 12, shown in FIG. 3.

As seen with reference to FIGS. 3-5, mount 100 is an example of a mount 10 that is substantially symmetrical about its central axis 30 and that includes a cover 48 that is threadingly coupled to a base 46. The coupler 20 of mount 100 comprises a double-sided foam tape 28 and is configured to operatively attach to a planar surface of an article 14, such as a snowboard, as illustrated in FIG. 1. As best seen in the exploded view of FIG. 3, the base 46 of mount 100 comprises a plurality of seat ledges 36 spaced radially about a concave lower seat surface 34 that is defined by a plurality of ribs that coincide with the seat ledges 36.

As best seen in the cross-sectional view of FIG. 5, mount 100 is an example of a mount 10 whose base 46 comprises a base sidewall 58 comprising an external thread 60 and whose cover 48 comprises a skirt 68 that comprises an internal thread 62. In addition, the cover 48 of mount 100 comprises a rib 64 that extends downward from the ceiling surface 54 of the cover 48 and that is spaced radially inward relative to the base sidewall 58. When the cover 48 is operatively and completely threaded to the base 46 and when an Apple™ AirTag™ device 12 is operatively received within the internal volume 18 of the housing 16, the rib 64 engages the upper surface of the Apple™ AirTag™ device 12 and compresses the battery compartment 55 of the Apple™ AirTag™ device against the plurality of seat ledges 36. Moreover, a gap 56 is present between the Apple™ AirTag™ device and the ceiling surface 54 to permit transmission of the Apple™ AirTag™ device's emitted sounds.

Illustrative, non-exclusive examples of inventive subject matter according to the present disclosure are described in the following enumerated paragraphs:

A. A mount (10) for securing a device (12) to an article (14), the mount (10) comprising:

a housing (16) having an internal volume (18) configured to selectively receive and retain the device (12) in the housing (16); and a coupler (20) attached to the housing (16) and configured to be operatively attached to the article (14).

A1. The mount (10) of paragraph A, wherein the coupler (20) is configured to be operatively attached to a planar surface of the article (14).

A2. The mount (10) of any of paragraphs A-A1, wherein the coupler (20) comprises an attachment surface (22) opposite the housing (16), and wherein the attachment surface (22) defines an attachment plane (24).

A3. The mount (10) of any of paragraphs A-A2, wherein the coupler (20) comprises an adhesive film (26).

A4. The mount (10) of any of paragraphs A-A3, wherein the coupler (20) comprises a double-sided foam tape (28).

A5. The mount (10) of any of paragraphs A-A3.1, wherein the mount (10) defines a central axis (30), and wherein the mount (10) is substantially radially symmetrical about the central axis (30).

A6. The mount (10) of any of paragraphs A-A5, wherein the housing (16) defines a seat (32) within the internal volume (18), and wherein the seat (32) is configured to mate with the device (12).

A6.1. The mount (10) of paragraph A6, wherein the seat (32) comprises a lower seat surface (34) configured to mate with the device (12).

A6.1.1. The mount (10) of paragraph A6.1, wherein the lower seat surface (34) is concave.

A6.2. The mount (10) of any of paragraphs A6-A6.1.1, wherein the seat (32) comprises one or more seat ledges (36) extending around a/the central axis (30) of the mount (10).

A6.2.1. The mount (10) of paragraph A6.2, wherein the internal volume (18) has a maximum internal-volume outer dimension (40), and wherein the one or more seat ledges (36) define an inside ledge diameter (38) that is less than the maximum internal-volume outer dimension (40).

A7. The mount (10) of any of paragraphs A-A6.2.1, wherein the housing (16) has a housing outermost perimeter (42), wherein the coupler (20) has a coupler outermost perimeter (44), and wherein the housing outermost perimeter (42) and the coupler outermost perimeter (44) are coextensive with each other.

A8. The mount (10) of any of paragraphs A-A7, wherein the housing (16) comprises a ceiling surface (54) that defines an upper side of the internal volume (18), wherein the internal volume (18) is configured so that when the device (12) is operatively received in the internal volume (18), there is a gap (56) between the device (12) and the ceiling surface (54) and the device (12) is fixed relative to the housing (16).

A9. The mount (10) of any of paragraphs A-A8, wherein the device (12) has a maximum device height (50), and wherein the internal volume (18) has a maximum internal-volume height (52) that is greater than the maximum device height (50).

A10. The mount (10) of any of paragraphs A-A9, wherein the housing (16) comprises:

a base (46), wherein the coupler (20) is attached to the base (46); and a cover (48) removably coupled to the base (46) to permit placement and removal of the device (12) in and from the internal volume (18).

A10.1. The mount (10) of paragraph A10, wherein the cover (48) is threadingly coupled to the base (46).

A10.1.1. The mount (10) of paragraph A10.1, wherein the cover (48) and the base (46) are configured to require at least a 90-degree rotation of the cover (48) relative to the base (46) for attachment and removal of the cover (48) to and from the base (46).

A10.2. The mount (10) of any of paragraphs A10-A10.1.1, wherein the mount (10) defines a/the central axis (30), wherein the base (46) comprises a/the lower seat surface (34) configured to engage the device (12), and wherein the base (46) comprises a base sidewall (58) extending upward from the lower seat surface (34) and circumferentially around the central axis (30).

A10.2.1. The mount (10) of paragraph A10.2, wherein the base sidewall (58) comprises an external thread (60), wherein the cover (48) comprises an internal thread (62) configured to mate with the external thread (60) of the base sidewall (58).

A10.2.1.1. The mount (10) of paragraph A10.2.1, wherein the cover (48) comprises a skirt (68), and wherein the skirt (68) comprises the internal thread (62).

A10.2.2. The mount (10) of any of paragraphs A10.2-A10.2.1.1, wherein the cover (48) comprises a/the ceiling surface (54) that defines an/the upper side of the internal volume (18), wherein the cover (48) comprises a rib (64) extending downward from the ceiling surface (54) and circumferentially around the central axis (30), and wherein the rib (64) is positioned closer to the central axis (30) than the base sidewall (58) when the cover (48) is operatively couped to the base (46).

A10.2.2.1. The mount (10) of paragraph A10.2.2 when depending from paragraph A6, wherein when the device (12) is operatively received within the internal volume (18) and the cover (48) is operatively coupled to the base (46), the rib (64) engages the device (12) and compresses the device (12) between the rib (64) and the seat (32).

A10.2.2.1.1. The mount (10) of paragraph A10.2.2.1, wherein the device (12) is configured to compress in height, optionally wherein the device (12) comprises a spring-loaded battery compartment (55).

A10.2.2.2. The mount (10) of any of paragraphs A10.2.2-A10.2.2.1.1, wherein the housing (16) further comprises a gasket (66) positioned adjacent to the rib (64) and positioned to be compressed between the base sidewall (58) and the cover (48) when the cover (48) is operatively coupled to the base (46).

A10.2.2.2.1. The mount (10) of paragraph A10.2.2.2 when depending from paragraph A10.2.1.1, wherein the gasket (66) is positioned between the rib (64) and the skirt (68).

A10.3. The mount (10) of any of paragraphs A10-A10.2.2.2.1, wherein the base (46) comprises a circumferential flange (70) extending away from a/the central axis (30) of the mount (10), and wherein the cover (48) engages the circumferential flange (70) when the cover (48) is operatively coupled to the base (46).

A10.3.1. The mount (10) of paragraph A10.3, wherein the housing (16) has a/the housing outermost perimeter (42), and wherein the circumferential flange (70) defines the housing outermost perimeter (42).

A10.4. The mount (10) of any of paragraphs A10-A10.3.1, wherein the cover (48) defines a plurality of depressions (72) spaced around a/the central axis (30) of the mount (10) and extending into the cover (48) toward the central axis (30).

A11. The mount (10) of any of paragraphs A-A10.4, wherein the housing (16) comprises a top surface (74) and an outer side surface (76), and wherein the housing (16) has a chamfer (80) between the top surface (74) and the outer side surface (76).

A12. The mount (10) of any of paragraphs A-A11, wherein the housing (16) comprises a/the top surface (74) and an/the outer side surface (76), and wherein the outer side surface (76) is at an angle (78) between 225 and 270 degrees to the top surface (74).

A13. The mount (10) of any of paragraphs A11-A12 when depending from paragraph A10, wherein the cover (48) comprises the top surface (74) and the outer side surface (76).

A14. The mount (10) of any of paragraphs A-A13, further comprising the device (12).

A14.1. The mount (10) of paragraph A14, wherein the device (12) is operatively received within the internal volume (18).

A15. The mount (10) of any of paragraphs A-A14.1, wherein the device (12) is a tracking device, optionally an Apple™ AirTag™ device.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A mount (10) for a tracking device (12), the mount (10) comprising:

a housing (16) having an internal volume (18) configured to receive and retain the tracking device (12) in the housing (16); and a coupler (20) attached to the housing (16) and configured to operatively attach the mount (10) to an article (14), wherein the coupler (20) comprises an adhesive or a magnet;

wherein the mount (10) defines a central axis (30); and wherein the internal volume (18) is substantially radially symmetrical about the central axis (30).

2. The mount (10) of claim 1, wherein the housing (16) comprises a ceiling surface (54) that defines an upper side of the internal volume (18); and wherein the internal volume (18) is configured so that when the tracking device (12) is operatively received in the internal volume (18), there is a gap (56) between the tracking device (12) and the ceiling surface (54), and the tracking device (12) is fixed relative to the housing (16).

3. The mount (10) of claim 2, wherein the housing (16) comprises a rib (64) extending downward from the ceiling surface (54); and wherein the rib (64) is positioned to engage the tracking device (12) and create the gap (56) when the tracking device (12) is operatively received in the internal volume (18).

4. The mount (10) of claim 1, wherein the coupler (20) is configured to operatively attach the mount (10) to a planar surface of the article (14).

5. The mount (10) of claim 1, wherein the coupler (20) comprises a double-sided foam tape (28) that comprises the adhesive.

6. The mount (10) of claim 5, wherein the housing (16) has a housing outermost perimeter (42);

wherein the double-sided foam tape (28) has a coupler outermost perimeter (44); and wherein the housing outermost perimeter (42) and the coupler outermost perimeter (44) are coextensive with each other.

7. The mount (10) of claim 1, wherein the coupler (20) comprises the adhesive.

8. The mount (10) of claim 1, wherein the coupler (20) comprises the magnet.

9. The mount (10) of claim 1, wherein the housing (16) defines a seat (32) within the internal volume (18); and wherein the seat (32) is configured to mate with the tracking device (12) when the tracking device (12) is operatively received in the internal volume (18).

10. The mount (10) of claim 1, wherein the housing (16) defines a seat (32) within the internal volume (18);

wherein the seat (32) comprises a lower seat surface (34); and wherein the lower seat surface (34) is concave.

11. The mount (10) of claim 10, wherein the mount (10) defines a central axis (30); and wherein the lower seat surface (34) comprises a plurality of ribs extending radially around the central axis (30).

12. The mount (10) of claim 1, wherein the housing (16) comprises:

a base (46); and a cover (48) configured to permit placement and removal of the tracking device (12) in and from the internal volume (18).

13. The mount (10) of claim 12, wherein the cover (48) is removably coupled to the base (46).

14. The mount (10) of claim 12, wherein the cover (48) is threadingly coupled to the base (46).

15. The mount (10) of claim 12, wherein the cover (48) has a friction-fit or snap-fit arrangement with the base (46).

16. The mount (10) of claim 12, wherein the base (46) comprises a flange (70); and wherein the cover (48) engages the flange (70) when the cover (48) is operatively coupled to the base (46).

17. The mount (10) of claim 12, wherein the base (46) comprises a base sidewall (58) that comprises an external thread (60); and wherein the cover (48) comprises a skirt (68) and comprises an internal thread (62) configured to mate with the external thread (60).

18. The mount (10) of claim 1, wherein the housing (16) comprises a top surface (74), an outer side surface (76), and a chamfer (80) between the top surface (74) and the outer side surface (76).

19. The mount (10) of claim 1, further comprising the tracking device (12) operatively received in the internal volume (18).

20. A mount (10) for a tracking device (12), the mount (10) comprising:

a housing (16) having an internal volume (18) configured to receive and retain the tracking device (12) in the housing (16); and a coupler (20) attached to the housing (16) and configured to operatively attach the mount (10) to an article (14), wherein the coupler (20) comprises an adhesive or a magnet;

wherein the housing (16) defines a seat (32) within the internal volume (18);

wherein the seat (32) comprises a lower seat surface (34);

wherein the lower seat surface (34) is concave;

wherein the mount (10) defines a central axis (30); and wherein the lower seat surface (34) comprises a plurality of ribs extending radially around the central axis (30).

21. A mount (10) for a tracking device (12), the mount (10) comprising:

a housing (16) having an internal volume (18) configured to receive and retain the tracking device (12) in the housing (16), wherein the housing (16) comprises:

a base (46), wherein the base (46) comprises a base sidewall (58) that comprises an external thread (60); and a cover (48) configured to permit placement and removal of the tracking device (12) in and from the internal volume (18), wherein the cover (48) comprises a skirt (68) and comprises an internal thread (62) configured to mate with the external thread (60); and a coupler (20) attached to the housing (16) and configured to operatively attach the mount (10) to an article (14), wherein the coupler (20) comprises an adhesive or a magnet.

* * * * *